(12) United States Patent
Nishitani et al.

(10) Patent No.: US 7,540,173 B2
(45) Date of Patent: Jun. 2, 2009

(54) METHOD AND APPARATUS FOR BENDING GLASS SHEETS

(75) Inventors: Masami Nishitani, Mie (JP); Makoto Shinohara, Mie (JP)

(73) Assignee: Central Glass Company, Limited, Ube-shi (JP)

( * ) Notice: Subject to any disclaimer, the term of this patent is extended or adjusted under 35 U.S.C. 154(b) by 541 days.

(21) Appl. No.: 11/349,900

(22) Filed: Feb. 9, 2006

(65) Prior Publication Data

US 2006/0123847 A1 Jun. 15, 2006

Related U.S. Application Data

(62) Division of application No. 10/119,705, filed on Apr. 11, 2002, now Pat. No. 7,024,889.

(30) Foreign Application Priority Data

Apr. 13, 2001 (JP) ............................ 2001-115984

(51) Int. Cl.
*C03B 23/023* (2006.01)

(52) U.S. Cl. ..................... 65/106; 65/107; 65/182.2; 65/291

(58) Field of Classification Search ................ 65/25.1, 65/25.2, 25.4, 106, 107, 182.1, 182.2, 287, 65/290, 291
See application file for complete search history.

(56) References Cited

U.S. PATENT DOCUMENTS

| 3,409,422 | A | 11/1968 | Gulotta et al. |
|---|---|---|---|
| 5,522,912 | A | 6/1996 | Kobayashi et al. |
| 6,014,873 | A | 1/2000 | Hirotsu et al. |
| 6,079,227 | A | 6/2000 | Yoshizawa et al. |
| 6,725,689 | B2 | 4/2004 | Honjo et al. |
| 2001/0001365 | A1* | 5/2001 | Boaz ............................ 65/258 |
| 2002/0095954 | A1* | 7/2002 | Honjo et al. .................. 65/25.1 |
| 2003/0110801 | A1 | 6/2003 | Nishitani et al. |
| 2004/0163416 | A1 | 8/2004 | Honjo et al. |

FOREIGN PATENT DOCUMENTS

| EP | 0882681 | 12/1998 |
|---|---|---|
| JP | 4910331 | 3/1974 |
| JP | 59037 | 1/1993 |
| JP | 6191867 | 7/1994 |
| JP | 8151221 | 6/1995 |
| JP | 7237928 | 9/1995 |
| JP | 10338533 | 12/1998 |

* cited by examiner

*Primary Examiner*—Steven P Griffin
*Assistant Examiner*—Erin Snelting
(74) *Attorney, Agent, or Firm*—Crowell & Moring LLP

(57) ABSTRACT

For bending a glass sheet so that the glass sheet has a compound curvature, an apparatus comprises a furnace including hearth beds on a bed support and a quenching unit provided with upper and lower air blowers. The final hearth bed may have a top surface with a simple curvature, be provided with one upstream corner cut away thereby defining a cut surface section and arranged in such a manner that the cut surface section is nearly parallel to the hearth bed adjacent to the final hearth bed. Alternatively, the final hearth bed may have a top surface with a compound curvature, so that the glass sheet is bent under the conditions set by controlling a temperature in a downstream part of the furnace, adjusting the inclination of the lower air blower and/or rotating final hearth bed so as to reverse the upstream and downstream ends thereof.

14 Claims, 4 Drawing Sheets

METHOD AND APPARATUS FOR BENDING GLASS SHEETS

CROSS REFERENCE TO RELATED APPLICATIONS

The present application is a division of application Ser. No. 10/119,705, filed Apr. 11, 2002 now U.S. Pat. No. 7,024,889, which claims benefit to Japanese priority application no. 2001-115984, filed Apr. 13, 2001, whose disclosure is hereby incorporated by reference in its entirety into the present application.

BACKGROUND OF THE INVENTION

The present invention relates to a method and an apparatus for bending a glass sheet so that the glass sheet has a compound curvature for use in, e.g., an automobile window.

Herein, a glass sheet having a compound curvature is defined as a glass sheet of three-dimensional shape, especially curved with desired curvature radii along both X- and Y-axis directions and thereby being convex in a Z-axis direction according to the orthogonal coordinate system. A glass sheet curved simply in one direction to be part-cylindrical is referred to as a glass sheet having a simple curvature. Further, the terms "upstream" and "downstream" are defined in relation to a direction in which the glass sheet is conveyed on one production line.

There are several methods for bending a glass sheet such as an automotive window glass. In one method, a glass sheet is heated to become soft and bent by making the heated glass sheet sag by gravitation in a mold. In another method, a glass sheet is heated and then pressed by press molds. In still another method, a glass sheet is heated and bent while floatingly conveyed over hearth beds in a furnace. More specifically, while the glass sheet is conveyed over a series of hearth beds in a conveyance direction, hot gas is ejected toward the glass sheet so that the glass sheet is floated over the hearth beds. The hearth beds have upper surfaces curved along a direction perpendicular to the conveyance direction. The glass sheet is thus heated with the hot gas, gradually sags by gravitation and is bent according to the curvature of the upper surfaces of the hearth beds. In a subsequent stage, the bent glass sheet is quenched in a quenching unit. Alternatively, the glass sheet may be conveyed by a series of rollers in the furnace and bent according to the curvature of the rollers. A decision as to which method should be used is made depending on the size and curvature of bent glass sheets to be fabricated.

Among the above methods, the method using the hearth beds in the furnace (hereinafter referred to as a hearth bed bending method) has the advantage in its productivity for bending the glass sheet along the direction perpendicular to the conveyance direction. Thus, the glass sheets having a simple curvature can be fabricated at low cost by the hearth bed bending method. In such a hearth bed bending method, it has been proposed to heat, bend and quench the glass sheets while conveying the glass sheets either upwardly or downwardly along the conveyance direction in order to also bend the glass sheets along the conveyance direction with a curvature radius of tens of thousand of millimeters. However, it is not easy to bend the glass sheet along the conveyance direction while conveying the heated glass sheets because of the furnace structure.

For example, U.S. Pat. No. 3,409,422 discloses an apparatus in which some hearth beds situated most downstream in a furnace and the lower air blower of a quenching unit are inclined downwardly along a conveyance direction to form a curvature curved in both of the conveyance direction and a direction perpendicular to the conveyance direction, when the apparatus is equipped to fabricate glass sheets having a compound curvature.

Further, U.S. Pat. No. 6,014,873 discloses an apparatus in which some hearth beds situated most downstream in a furnace are inclined upwardly along a conveyance direction so that the final hearth bed and the lower air blower of a quenching unit form an upwardly convex curvature, when fabricating glass sheets having a compound curvature.

U.S. Pat. No. 5,522,912 discloses an apparatus in which the final hearth bed has a top surface of which at least a downstream part is curved in a conveyance direction and is inclined upwardly, for fabricating glass sheets having a compound curvature.

In each of the above conventional apparatuses, the equipment thereof (especially, the final hearth bed) needs to be replaced and adjusted, when a different kind of product is to be fabricated. More specifically, in the U.S. Pat. Nos. 3,409,422 and 6,014,873, the above-mentioned downstream hearth beds and quenching unit need to be replaced with new ones. Then, the newly equipped hearth beds and quenching unit have to be positioned in place by adjusting their respective supports so as to be properly inclined and connected with each other. In U.S. Pat. No. 5,522,912, the final hearth bed has to be replaced with a new one. The newly equipped bed needs to be inclined upwardly by adjusting its support properly. Such replacement and adjustment require much time and labor, whereby the profitable merit of the hearth bed bending method (i.e., high productivity) cannot be maintained. In addition, there arises a problem that the position to take out the bent glass sheets from the apparatus may become too low, when the glass sheets are conveyed downwardly along the conveyance direction through the apparatus.

SUMMARY OF THE INVENTION

In view of the foregoing, an apparatus has been developed as disclosed in Japanese Patent No. 2809596 and Japanese Unexamined Patent Publication No. 7-237928, in order to save time and labor required to replace and adjust the equipment of the apparatus for fabrication of a different kind of product.

In an apparatus disclosed in Japanese Patent No. 2809596, the final hearth bed is arranged in alignment with other hearth beds for bending glass sheets to have a simple curvature. For bending glass sheets to have a compound curvature, the final hearth bed is rotated about a vertical axis of rotation, without being inclined, so that the upstream end surface of the final hearth bed forms a slight angle with the downstream end surface of a hearth bed next to the final hearth bed, and at the same time, the lower air blower of a quenching unit is inclined downwardly along the conveyance direction. In this state, the top surface of the final hearth bed is curved upwardly in both the conveyance direction and the direction perpendicular to the conveyance direction, whereby the flat glass sheet is bent into a shape having a compound curvature. Thus, a different kind of product can be fabricated with ease, i.e., a glass sheet can be bent to have a simple curvature or to have a compound curvature with ease because the production line can be modified only by rotating the final hearth bed without replacing it with another one. It is also beneficial that the final hearth bed can be shared even in fabricating different kinds of products. However, when the glass sheet is to be bent with a smaller radius of curvature along the conveyance direction, the final hearth bed has to be rotated further so that the top surface of the final hearth bed is curved with a smaller radius of curvature along the conveyance direction. In such a case, the space between the final hearth bed and the hearth bed next to the final hearth bed becomes larger, which causes a pressure drop of gas ejection due to gas leak through the space. Buoyancy to float the glass sheet becomes weaker owing to the pressure drop. The glass sheet is caused to rub against the hearth beds, thereby being formed with flaws and cracks.

Further, in an apparatus disclosed in Japanese Unexamined Patent Publication No. 7-237928, one side of a bent glass sheet is quenched, and then, both sides of the bent glass sheet are quenched in order to modify a curvature of the bent glass sheet. It is however necessary to provide additional equipment, such as a gas blowing system for previously quenching one side of the bent glass sheet.

It is therefore an object of the present invention to provide a method for bending a glass sheet so that the glass sheet has a compound curvature by heating the glass sheet while conveying it over a series of hearth beds in a furnace without disposing any hearth bed so as to be inclined either upwardly or downwardly along a conveyance direction.

It is also an object of the present invention to provide an apparatus suitable for carrying out the above method.

According to a first aspect of the present invention, there is provided a method for bending a glass sheet, comprising the steps of: preparing a plurality of hearth beds and a final hearth bed, the plurality of hearth beds having top surfaces curved in a direction perpendicular to a conveyance direction with curvature radii that gradually decrease as located more downstream, the final hearth bed having an axis extending between upstream and downstream ends thereof, a top surface curved in a direction perpendicular to the axis of the final hearth bed with a predetermined curvature radius and an upstream end surface including a first surface section tilted toward a downstream end surface of the final hearth bed so as to form an angle θ with respect to a direction perpendicular to the axis of the final hearth bed; disposing the plurality of hearth beds and the final hearth bed in a furnace in such a manner that the final hearth bed is situated downstream of the plurality of hearth beds with the first surface section being located adjacent to and substantially parallel to a downstream end surface of adjacent one of the plurality of hearth beds; and heating the glass sheet in the furnace while conveying the glass sheet in the conveyance direction over the plurality of hearth beds and the final hearth bed, thereby bending the glass sheet so that the glass sheet has a compound curvature.

According to a second aspect of the present invention, there is provided a method for bending a glass sheet, comprising the steps of: placing a plurality of hearth beds and a final hearth bed on a bed support in a furnace with flat bottom portions of the plurality of hearth beds and of the final hearth bed and a flat support surface of the bed support contacted with each other, the plurality of hearth beds having top surfaces curved in a direction perpendicular to a conveyance direction with curvature radii that gradually decrease as located more downstream, the final hearth bed being placed downstream of the plurality of hearth beds and having a top surface curved in both the conveyance direction and the direction perpendicular to the conveyance direction so as to be upwardly convex (in one embodiment, only the final hearth bed is curved in the conveyance direction); arranging a quenching unit provided with upper and lower air blowers downstream of the final hearth bed; setting conditions for bending the glass sheet into a shape having a desired compound curvature, the step of setting comprising at least one of the steps of changing a temperature in a downstream part of the furnace, positioning the upper and lower air blowers in such a manner that a tangent to an upstream end portion of a top surface of the lower air blower forms an angle α with respect to a tangent to a downstream end portion of the top surface of the final hearth bed and is downwardly inclined with respect to a horizontal plane, and rotating the final hearth bed about a vertical axis of rotation so as to reverse upstream and downstream ends thereof; heating the glass sheet in the furnace while conveying the glass sheet in the conveyance direction over the plurality of hearth beds and the final hearth bed, thereby bending the glass sheet so that the glass sheet has the desired compound curvature; and quenching the glass sheet in the quenching unit while conveying in the conveyance direction over the lower air blower.

According to a third aspect of the present invention, there is provided an apparatus for bending a glass sheet, comprising: a furnace including therein a bed support, a plurality of hearth beds and a final hearth bed both placed on the bed support, the plurality of hearth beds having top surfaces curved in a direction perpendicular to a conveyance direction with curvature radii that gradually decrease as located more downstream, the final hearth bed having an axis extending between upstream and downstream ends thereof, a top surface curved in a direction perpendicular to the axis of the final hearth bed with a predetermined curvature radius and an upstream end surface including a first surface section tilted toward a downstream end surface of the final hearth bed so as to form an angle θ with respect to a direction perpendicular to the axis of the final hearth bed, the final hearth bed being placed downstream of the plurality of hearth beds in such a manner that the first surface section is located adjacent to and substantially parallel to a downstream end surface of adjacent one of the plurality of hearth beds; a quenching unit provided with upper and lower air blowers and arranged downstream of the final hearth bed; and a conveyor that conveys the glass sheet in the conveyance direction through the furnace and the quenching unit.

According to a fourth aspect of the present invention, there is provided an apparatus for bending a glass sheet, comprising: a furnace including therein a bed support provided with a flat support surface, a plurality of hearth beds and a final hearth bed both having flat bottom portions and placed on the bed support with the flat bottom portions and the support surface contacted with each other, the plurality of hearth beds having top surfaces curved in a direction perpendicular to a conveyance direction with curvature radii that gradually decrease as located more downstream, the final hearth bed being located downstream of the plurality of hearth beds and having a top surface curved in both the conveyance direction and the direction perpendicular to the conveyance direction so as to be upwardly convex, the furnace having a plurality of temperature zones and capable of controlling a temperature in each temperature zone; a quenching unit provided with upper and lower air blowers and arranged downstream of the final hearth bed in such a manner that a tangent to an upstream end portion of a top surface of the lower air blower forms an angle α with respect to a tangent to a downstream end portion of the top surface of the final hearth bed and is inclined downwardly with respect to a horizontal plane; and a conveyor that conveys the glass sheet in the conveyance direction through the furnace and the quenching unit.

As described above, in the methods and apparatuses of the present invention, all the hearth beds including the final hearth bed are placed on the bed support with the flat bottom portions of the heart beds and the flat support surface of the bed support contacted with each other. In other words, there is no necessity to incline any hearth bed either upwardly or downwardly along the conveyance direction, even when fabricating the glass sheets having a compound curvature.

Accordingly, the equipment of apparatus can be shared as much as possible. It is therefore possible to simplify the setting of the apparatus and save time and labor necessary for the setting when a different kind of product is to be fabricated.

DESCRIPTION OF THE EMBODIMENTS

Figure 1:
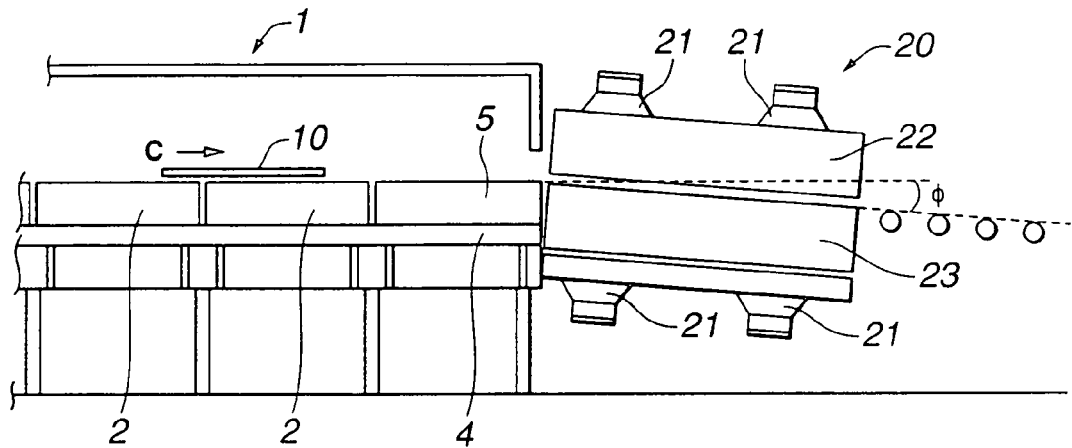
FIG. 1 is a schematic view of an apparatus for bending a glass sheet according to a first embodiment of the present invention.

Hereinafter, an explanation will be given of methods and apparatuses for bending glass sheets according to the present invention based on the following exemplary embodiments with reference to the drawings. It should be noted that the curvatures of a final hearth bed and an air blower as well as space between hearth beds are slightly exaggerated in the drawings for the purpose of illustration.

Firstly, an apparatus for bending a glass sheet 10 according to the first embodiment of the invention will be described with reference to FIGS. 1 to 3.

The apparatus of the first embodiment comprises a gas hearth furnace 1 and a quenching unit 20. The apparatus further comprises a conveyor chain 3 (omitted from FIG. 1) for conveying the glass sheet 10 in a conveyance direction (indicated by an arrow C) through the apparatus. Pads (not shown) are put on the conveyor chain 3 and used for holding the glass sheet 10.

The gas hearth furnace 1 is a tunnel furnace, and includes therein a bed support 4, a plurality of hearth beds 2 and a final hearth bed 5 situated downstream of the hearth beds 2. The bed support 4 may be formed of a single piece or some separate portions. The hearth beds 2 and 5 are generally rectangular and arranged in line on the bed support 4. Although a little space is provided between adjacent two of the hearth beds 2 and 5 as shown in FIGS. 1 and 2, the hearth beds 2 and 5 may be arranged so as to contact with each other.

The hearth beds 2 and 5 have flat bottom surfaces, while the bed support 4 has a support surface that is flat though declines a little as will be described below. It is therefore possible to set the hearth beds 2 and 5 appropriately just by placing them on the bed support 4, without adjusting each of the hearth beds 2 and 5 so as to be inclined either upwardly or downwardly along the conveyance direction throughout the furnace. In other words, the hearth beds 2 and 5 can be held in place when placed on the bed support 4. This makes it less labored to set the equipment of apparatus. Further, the support surface of the bed support 4 declines toward the conveyor chain 3 at an angle of a few degrees with respect to a horizontal plane. Thus, the hearth beds 2 and 5 decline toward the conveyor chain 3 at the same angle with respect to a horizontal plane when placed on the bed support 4. This makes it possible to easily support the glass sheet 10 by the pads put on the conveyor chain 3.

The most upstream hearth bed 2 and some other hearth beds 2 adjacent thereto have flat top surfaces. The remaining hearth beds 2 have top surfaces that are curved along a direction perpendicular to the conveyance direction so as to have simple curvatures whose radii gradually decrease as the hearth beds 2 are located more downstream. At least one of the hearth beds 2 situated adjacent to the final hearth bed 5 has a top surface curved along the direction perpendicular to the conveyance direction with a predetermined curvature radius, which is substantially equivalent to the curvature radius of a bent glass sheet to be fabricated.

Figure 2:
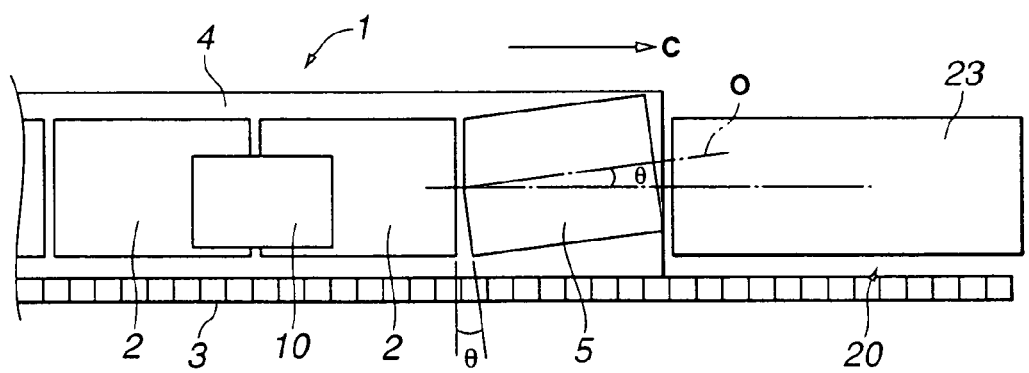
FIG. 2 is a schematic plane view of hearth beds, a final hearth bed and a lower air blower provided in the apparatus of FIG. 1.
Figure 3:
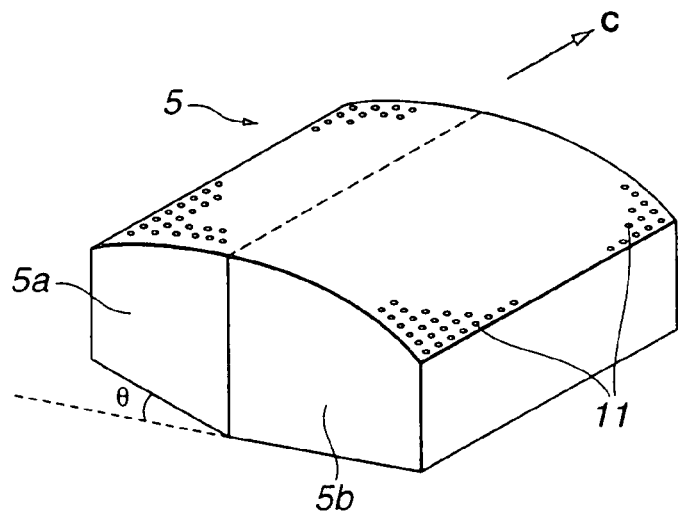
FIG. 3 is a perspective view of the final hearth bed of FIG. 2.

As shown in FIGS. 2 and 3, the final hearth bed 5 has an axis O extending between its upstream end through its downstream end. The top surface of the final hearth bed 5 is curved in a direction perpendicular to the axis O with substantially the same curvature radius as the above predetermined curvature radius and is provided with its one upstream corner cut away thereby defining a cut surface section 5a on the upstream end surface. More specifically, the upstream end surface of the final hearth bed 5 includes the cut surface section 5a tilted toward the downstream end surface of the final hearth bed 5 so as to form an angle θ with respect to the axis O of the final hearth bed 5. In this embodiment, the upstream end surface of the final hearth bed 5 further includes a surface section 5b parallel to the downstream end surface of the final hearth bed 5 (i.e., extending in the direction perpendicular to the axis O). The final hearth bed 5 is arranged in such a manner that the cut surface section 5a faces toward and becomes substantially parallel to the downstream end surface of the hearth bed 2 adjacent to the final hearth bed 5 (referred to as an adjacent hearth bed) and that the axis O of the final hearth bed 5 forms the angle θ with respect to the conveyance direction, as shown in FIG. 2. By this arrangement, the top surface of the final hearth bed 5 has a curvature curved in both the conveyance direction and the direction perpendicular to the conveyance direction. Preferably, the cut surface section 5a is formed so that the angle θ is from 1 to 2 degrees. Also, the cut surface section 5a may be formed so that the intersection of the surface sections 5a and 5b is located on the axis O when observed in plane.

Each of the hearth beds 2 and 5 is provided with a plurality of gas ejection holes 11 as shown in FIG. 3. While the glass sheet 10 is conveyed in the conveyance direction through the gas hearth furnace 1 by means of the conveyor chain 3, hot gas is ejected from the gas ejection holes 11 so that the glass sheet 10 is held afloat over the hearth beds 2 and 5. The glass sheet 10 is then heated to a softening point with the hot gas while floatingly conveyed through the gas hearth furnace 1.

Using the above apparatus, the glass sheet 10 is bent into a shape having a compound curvature while conveyed over the hearth beds 2 and 5 in the gas hearth furnace 1. As the final hearth bed 5 is provided with the cut surface section 5a and disposed in such a manner that the cut surface section 5a is situated adjacent to and nearly parallel to the adjacent hearth bed 2, the space between the final hearth bed 5 and the adjacent hearth bed 2 becomes smaller. It is therefore possible to maintain buoyancy to float the glass sheet 10 by preventing pressure drop in the gas ejection. Thus, the glass sheet 10 can be prevented from rubbing against the final hearth bed 5 and the adjacent hearth bed 2, even when the final hearth bed 5 is rotated about a vertical axis of rotation so that the surface section 5b forms a relatively large angle with the downstream end surface of the adjacent hearth bed 2. This makes it possible to prevent flaws and cracks in the glass sheet 10 due to the rubbing.

Meanwhile, it is not necessary to contact the cut surface section 5a with the adjacent hearth bed 2 and to arrange the cut surface section 5a parallel to the adjacent hearth bed 2. However, a good repeatability in arrangement of the final hearth bed 5 can be attained by contacting the cut surface section 5a with the adjacent hearth bed 2 or arranging the cut surface section 5a parallel to the adjacent hearth bed 2.

To bend the glass sheet 10 so that the glass sheet 10 has a simple curvature by the use of the above-described apparatus, the final hearth bed 5 may be rearranged so that the surface section 5b is located adjacent to and parallel to the downstream end surface of the adjacent hearth bed 2.

The quenching unit 20 is provided adjacent to the final hearth bed 5 via an outlet of the gas hearth furnace 1, and is supported by a support column provided with a jack (not shown). The quenching unit 20 includes upper and lower air blowers 22 and 23. Each of the upper and lower air blowers 22 and 23 is provided with air ducts 21 through which cooling air is supplied to the upper and lower air blowers 22 and 23. The lower air blower 23 has a top surface curved in the direction perpendicular to the conveyance direction with substantially the same curvature as that of the final hearth bed 5. The upper air blower 22 has a bottom surface curved corresponding to the top surface of the lower air blower 23. Herein, the lower air blower 23 serves as a quenching bed. The glass sheet 10 bent in the gas hearth furnace 1 is quenched rapidly with the cooling air blown from the upper and lower air blowers 22 and 23.

Preferably, the quenching unit 20 is disposed in such a manner that the top surface of the lower air blower 23 is inclined downwardly as located downstream at an angle $\phi$ with respect to the top surface of the final hearth bed 5 in order to bend the glass sheet 10 in the conveyance direction while preventing flows and cracks in the glass sheet 10. The angle $\phi$ is generally equal to or smaller than 1 degree, preferably equal to or smaller than 0.5 degrees.

Further, the quenching unit 20 may be used commonly for bending the glass sheet 10 to have a simple curvature and a compound curvature without the necessity of being changed to another one. In such a case, the inclination of the quenching unit 20 is adjusted properly by using the jack. More specifically, the quenching unit 20 is arranged so that the top surface of the lower air blower 23 is leveled (i.e., the angle $\phi$ is zero) for bending the glass sheet 10 to have a simple curvature. Alternatively, another lower air blower may be provided with a top surface curved in both the conveyance direction and the direction perpendicular to the conveyance direction.

Next, an apparatus for bending a glass sheet 10 according to the second embodiment of the invention will be described with reference to FIGS. 4, 5, 6A to 6C and 7, in which like parts and portions are designated by like reference numerals and repeated descriptions thereof are omitted.

The apparatus of the second embodiment is the same as that of the first embodiment, except that a final hearth bed 50 provided with gas ejection holes and a quenching unit 200 including upper and lower air blowers 220 and 230 are used in place of the final hearth bed 5 and the quenching unit 20, respectively.

The final hearth bed 50 is generally rectangular and has a flat bottom surface. Further, the final hearth bed 50 has a top surface curved in both the conveyance direction and the direction perpendicular to the conveyance direction so as to be upwardly convex with its apex 12 (refer to FIG. 5). More specifically, the top surface of the final hearth bed 50 is curved along the direction perpendicular to the conveyance direction with the same curvature radius as that of the adjacent hearth bed 2, which is substantially equivalent to the curvature radius of a bent glass sheet to be fabricated, and is curved in a smooth curve along the conveyance direction.

Figure 6A:
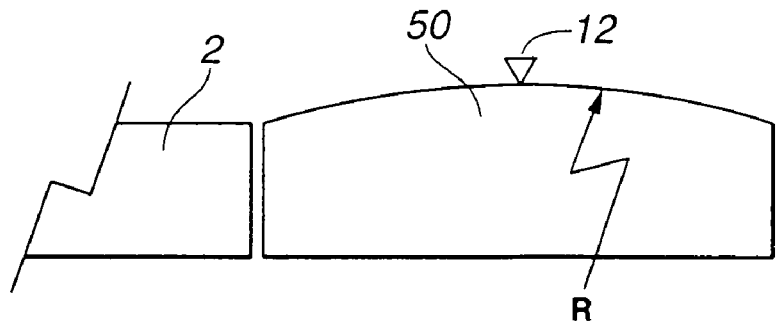
FIGS. 6A to 6C are schematic views of various modifications of the final hearth bed of FIG. 5.
Figure 6B:
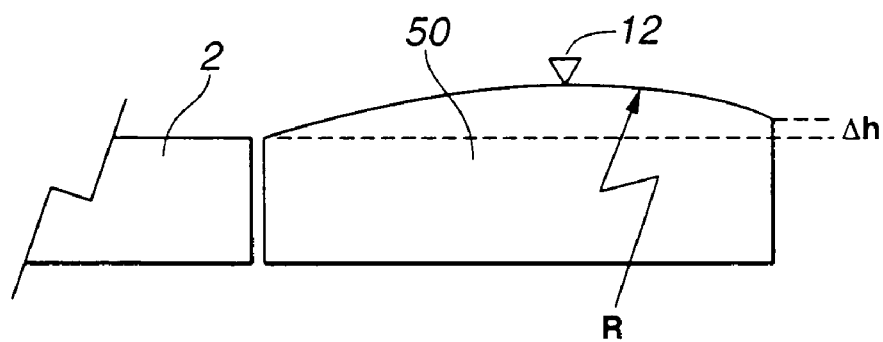

For example, the top surface of the final hearth bed 50 may be curved in an arc with a single curvature radius R along the conveyance direction. In this case, the apex 12 is not necessarily located at the center of the top surface of the final hearth bed 50, and may be situated on the upstream side or downstream side of the center. When the apex 12 is situated on the downstream side as shown in FIG. 6B, the downstream end of the top surface is made $\Delta h$ higher than the upstream end of the top surface. On the other hand, if the apex 12 is situated on the upstream side, the upstream end of the top surface is made higher than the downstream end of the top surface.

Figure 6C:
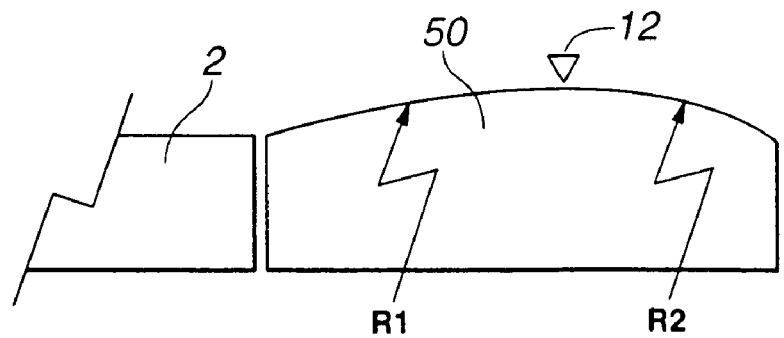

Alternatively, the top surface of the final hearth bed 50 may be shaped in another smooth curve, such as a spline curve, along the conveyance direction. Both of the upstream and downstream ends of the top surface are not necessarily at the same height. However, when the upstream and downstream ends of the top surface are at the same height, the final hearth bed 50 may be rotated about a vertical axis of rotation so as to reverse the upstream and downstream ends thereof for modifying the curvature of the bent glass sheet. By way of example, it is now assumed that the top surface of the final hearth bed 50 is smoothly curved along the conveyance direction with two different curvature radii R1 and R2: the upstream side of the top surface is curved with the curvature radius of R1=30,000 mm and the downstream side of the top surface is curved with the curvature radius of R2=20,000 mm and that the upstream and downstream ends of the top surface are at the same height, as shown in FIG. 6C. In FIG. 6C, the apex 12 is situated downstream of the center of the top surface and spaced therefrom by about 65 mm in length (i.e., about 9% of the length of the final hearth bed). If the final hearth bed 50 is rotated about the vertical axis of rotation to dispose the upstream and downstream ends thereof inversely, the apex 12 is shifted to the upstream side. In this case, the glass sheet 10 can be bent with a smaller curvature radius along the conveyance direction after the final hearth bed 50 is rotated so as to reverse the upstream and downstream ends thereof.

Herein, the final hearth bed 50 needs to be connected with both of the hearth bed 2 adjacent to the final hearth bed 50 (referred to as an adjacent hearth bed) and the lower air blower 230 smoothly. Further, when the apex 12 is situated on the downstream side, it becomes possible to use the gas hearth furnace 1 throughout its length for heating and bending the glass sheet 10. However, the glass sheet 10 is liable to be affected by the atmosphere and/or the cooling air from the quenching unit 200, when the apex 12 is situated too closely to the outlet of the gas hearth furnace 1. This will cause unstable bending of the glass sheet 10. Moreover, the downwardly inclined downstream end portion of the top surface of the final hearth bed 50 is effective for making the glass sheet 10 be unlikely to be damaged at around the connection between the final hearth bed 50 and the quenching unit 200. It is therefore preferable that the apex 12 is situated on the upstream side or downstream side of the center of the top surface and spaced therefrom by a distance of 15% or less of the length of the final hearth bed. In the case that the final hearth bed 50 has a typical length of 762 mm (30 in.) along the conveyance direction, it is preferable that the apex 12 is situated on the upstream side or downstream side of the center of the top surface and spaced therefrom by a distance of 114 mm or less.

Further, the gas hearth furnace 1 has a plurality of temperature zones along the conveyance direction, and can control the temperature in each temperature zone. The temperatures in some temperature zones located most downstream, which occupy 20% of the gas hearth furnace 1 in length, may be changed so as to modify the curvature of the bent glass sheet. It is especially effective for modification of the curvature to change the temperatures in the last three temperature zones located most downstream, which occupy 15% of the gas hearth furnace 1 in length. More specifically, the glass sheet 10 can be bent with a larger curvature radius along the conveyance direction, when the temperatures in the above temperature zones are decreased. On the other hand, the glass sheet 10 can be bent with a smaller curvature radius along the conveyance direction, when the temperatures in the above temperature zones are increased. The temperatures in the above temperature zones may be set at the same value or set at gradually varying values from upstream to downstream. The temperatures in the temperature zones can be determined in consideration of, e.g., the heating capacity of the gas hearth furnace 1 and the properties of the glass sheet 10.

The quenching unit 200 includes the upper and lower air blowers 220 and 230. The top surface of the lower air blower 230 is curved in both the conveyance direction and the direction perpendicular to the conveyance direction, while the bottom surface of the upper air blower 220 is shaped corresponding to the top surface of the lower air blower 230. Herein, the lower air blower 230 serves as a quenching bed.

Figure 7:
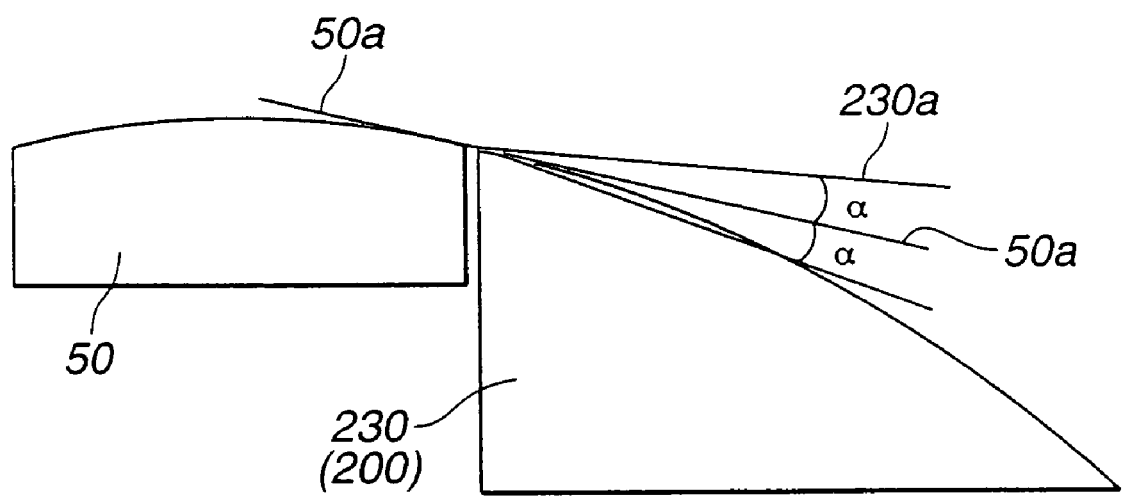
FIG. 7 is a schematic illustration showing a connection between the final hearth bed and a lower air blower provided in the apparatus of FIG. 4.

The quenching unit 200 may be disposed in such a manner that a tangent 230a to an upstream end portion of the top surface of the lower air blower 230 forms an angle α with respect to a tangent 50a to a downstream end portion of the top surface of the final hearth bed 50 as shown in FIG. 7, so as to modify the curvature of the bent glass sheet. More specifically, the glass sheet 10 can be bent with a larger curvature radius along the conveyance direction, when the lower air blower 230 is inclined in the conveyance direction upwardly at the angle α. On the other hand, the glass sheet 10 can be bent with a smaller curvature radius along the conveyance direction, when the lower air blower 230 is inclined in the conveyance direction downwardly at the angle α. The angle α is adjusted in such a manner that a tangent to the upstream portion of top surface of the lower air blower 230 is inclined downwardly in the conveyance direction with respect to a horizontal plane. For example, when the final hearth bed 50 has a typical length of 762 mm (30 in.) along the conveyance direction and the top surface thereof is curved with a curvature radius of 20,000 mm along the conveyance direction, the tangent 50a extend downwardly at about 1.2 degrees with respect to the horizontal plane. Therefore, in this case, when the lower air blower 230 is inclined upwardly in the conveyance direction, the inclination angle α is set to generally equal to or smaller than 1 degree, preferably equal to or smaller than 0.5 degrees.

As described above, it is possible to modify the curvature of the bent glass sheet just by controlling the temperatures in the temperature zones, adjusting the inclination angle α of the quenching unit 200, and/or rotating the final hearth bed 50 about the vertical axis of rotation. It is also possible to adjust the position to take out the bent glass sheet from the apparatus by a combination of controlling the temperatures in the temperature zones and adjusting the inclination angle α of the quenching unit 200.

The present invention will be specifically illustrated in more detail by way of the following examples.

EXAMPLE 1

Figure 4:
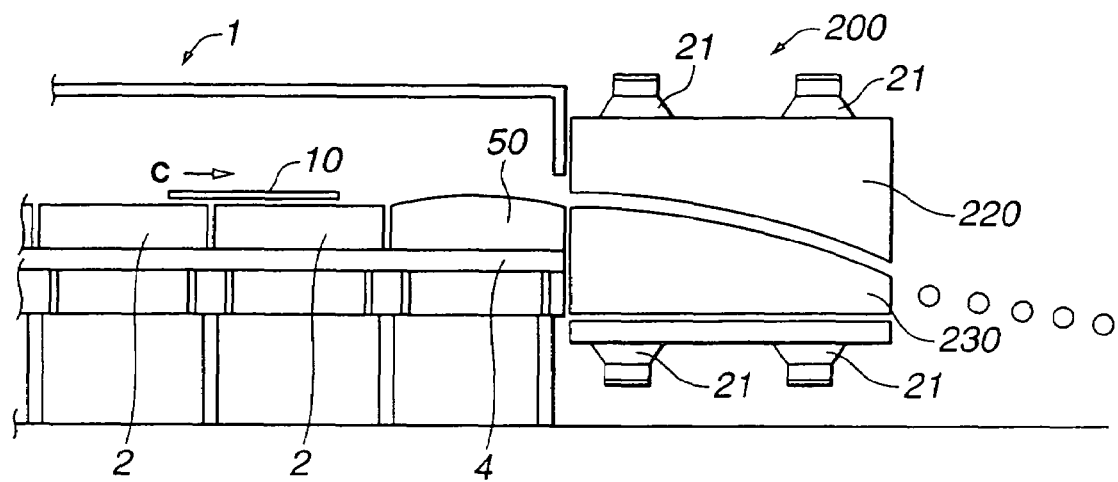
FIG. 4 is a schematic view of an apparatus for bending a glass sheet according to a second embodiment of the present invention.
Figure 5:
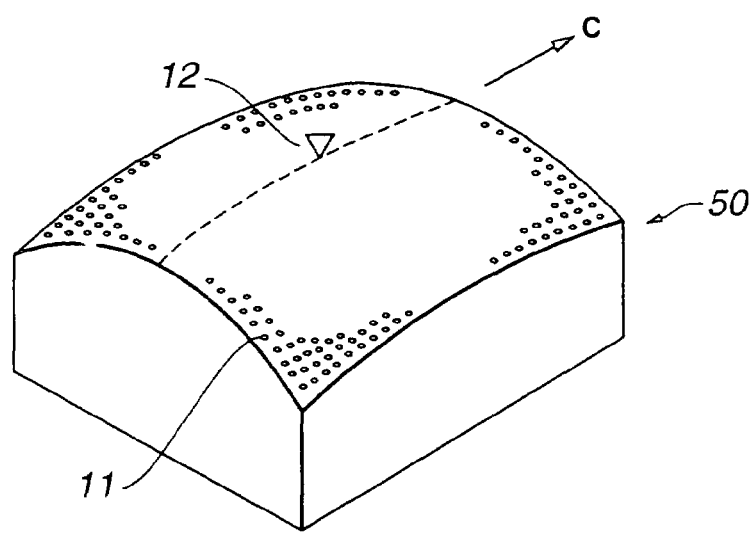
FIG. 5 is a perspective view of a final hearth bed provided in the apparatus of FIG. 4.

A glass sheet having a size of 820 mm×520 mm, a length of 762 mm and a thickness of 3.5 mm was bent using the apparatus as shown in FIG. 4. The furnace was constructed so as to have eleven temperature zones, and adjusted the temperatures in the last three temperature zones to 680° C. The final hearth bed had a top surface curved with a curvature radius of 20,000 mm in the conveyance direction and a curvature radius of 1,250 mm in the direction perpendicular to the conveyance direction so that the top surface was made upwardly convex with its apex located at the center. The quenching unit was disposed without being inclined (i.e., α=0). The lower air blower had a top surface curved with substantially the same curvature radii in both the conveyance direction and the direction perpendicular to the conveyance direction as those of the final hearth bed.

The obtained bent glass sheet had a compound curvature with a curvature radius of 24,540 mm in the conveyance direction and a curvature radius of about 1,250 mm in the direction perpendicular to the conveyance direction.

EXAMPLE 2

A glass sheet having the same size, length and thickness as used in Example 1 was bent under the same condition, except that the top surface of the final hearth bed was curved with a curvature radius of 30,000 mm in the conveyance direction and the quenching unit was disposed downwardly at the inclination angle α of about 1 degree. In this arrangement, the downstream end portion of the top surface of the final hearth bed is at a downward angle of about 0.7 degrees with respect to a horizon.

The obtained bent glass sheet had a curvature radius of about 20,000 mm in the conveyance direction and a curvature radius of 1,250 mm in the direction perpendicular to the conveyance direction.

EXAMPLE 3

A glass sheet having the same size and thickness as used in Example 1 was bent under the same condition, except that the temperatures in the last three temperature zones were changed. When the temperatures in the last three temperature zones were made 10° C. higher, the obtained bent glass sheet had a curvature radius of 22,320 mm in the conveyance direction. On the other hand, when the temperatures in the last three temperature zones were made 10° C. lower, the obtained bent glass sheet had a curvature radius of 26,150 mm in the conveyance direction. In either case, the obtained bent glass sheet had a curvature radius of 1,250 mm in the direction perpendicular to the conveyance direction.

The apparatus used in this example was allowed to change the temperatures in the temperature zones within a range of 680±25° C. to modify the curvature of the bent glass sheets. However, it was possible to modify the curvature of the bent glass sheets as described above by changing the temperatures by only ±10° C.

As described above, it is possible to simplify the setting of apparatus equipment for changing the kind of products to be fabricated according to the present invention, without the necessity to dispose the hearth beds so as to be inclined upwardly or downwardly, i.e., to change the inclinations of the hearth beds by adjusting their respective supports, and is therefore possible to maintain high productivity.

Although the invention has been described with reference to specific embodiments of the invention, the invention is not limited to the above-described embodiments. Various modification and variation of the embodiments described above will occur to those skilled in the art in light of the above teaching. For example, the hearth beds 2, 5 and 50 may have bottom surfaces that are partly flat so that the bed support 4 supports the hearth beds 2, 5 and 50 through such flat portions. Further, the final hearth bed 5 of the first embodiment may have a cut surface section defined by cutting away the other upstream corner thereof so that the final hearth bed 5 is rotated to the opposite direction. The scope of the invention is defined with reference to the following claims.

What is claimed is:

1. A method for bending a glass sheet, comprising the steps of:
   preparing a plurality of hearth beds and a final hearth bed, the plurality of hearth beds having top surfaces curved in a direction perpendicular to a conveyance direction with curvature radii that gradually decrease as located more downstream, the final hearth bed having an axis extending between upstream and downstream ends thereof, a top surface curved in a direction perpendicular to the axis of the final hearth bed with a predetermined curvature radius and an upstream end surface including a first surface section tilted toward a downstream end surface of the final hearth bed so as to form an angle $\Theta$ with respect to a direction perpendicular to the axis of the final hearth bed when observed in plane;
   disposing the plurality of hearth beds and the final hearth bed in a furnace in such a manner that the final hearth bed is situated downstream of the plurality of hearth beds with the first surface section of the upstream end surface of the final hearth bed being located adjacent to and substantially parallel to a downstream end surface of adjacent one of the plurality of hearth beds; and
   heating the glass sheet in the furnace while conveying the glass sheet in the conveyance direction over the plurality of hearth beds and the final hearth bed, thereby bending the glass sheet so that the glass sheet has a compound curvature.

2. The method according to claim 1, wherein the final hearth bed is generally rectangular, and the upstream end surface of the final hearth bed further includes a second surface section parallel to the downstream end surface of the final hearth bed so as to form an angle between the second surface section and the downstream end surface of said adjacent one of the plurality of hearth beds when observed in plane.

3. The method according to claim 2, wherein an intersection of the first and second surface sections is located on the axis of the final hearth bed when observed in plane.

4. The method according to claim 1, wherein the angle $\Theta$ is within a range from 1 to 2 degrees.

5. The method according to claim 1, wherein the step of disposing includes placing the plurality of hearth beds and the final hearth bed on a bed support with flat bottom portions of the plurality of hearth beds and the final hearth bed and a flat support surface of the bed support contacted with each other.

6. The method according to claim 1, further comprising the steps of:
   arranging a quenching unit provided with upper and lower air blowers downstream of the final hearth bed in such a manner that a top surface of the lower air blower is inclined downwardly as located downstream so as to form an angle $\Phi$ with respect to the top surface of the final hearth bed; and
   quenching the glass sheet in the quenching unit while conveying the glass sheet in the conveyance direction over the lower air blower.

7. The method according to claim 1, wherein the first surface section is defined by cutting away an upstream end corner of the final hearth bed.

8. An apparatus for bending a glass sheet, comprising:
   a furnace including therein a bed support, a plurality of hearth beds and a final hearth bed both placed on the bed support, the plurality of hearth beds having top surfaces curved in a direction perpendicular to a conveyance direction with curvature radii that gradually decrease as located more downstream, the final hearth bed having an axis extending between upstream and downstream ends thereof, a top surface curved in a direction perpendicular to the axis of the final hearth bed with a predetermined curvature radius and an upstream end surface including a first surface section tilted toward a downstream end surface of the final hearth bed so as to form an angle $\Theta$ with respect to a direction perpendicular to the axis of the final hearth bed when observed in plane, the final hearth bed being placed downstream of the plurality of hearth beds in such a manner that the first surface section of the upstream end surface of the final hearth bed is located adjacent to and substantially parallel to a downstream end surface of adjacent one of the plurality of hearth beds;
   a quenching unit provided with upper and lower air blowers and arranged downstream of the final hearth bed; and
   a conveyor that conveys the glass sheet in the conveyance direction through the furnace and the quenching unit.

9. The apparatus according to claim 8, wherein the final hearth bed is generally rectangular, and the upstream end surface of the final hearth bed further includes a second surface section parallel to the downstream end surface of the final hearth bed so as to form an angle between the second surface section and the downstream end surface of said adjacent one of the plurality of hearth beds when observed in plane.

10. The apparatus according to claim 9, wherein an intersection of the first and second surface sections is located on the axis of the final hearth bed when observed in plane.

11. The apparatus according to claim 8, wherein the angle $\Theta$ is within a range from 1 to 2 degrees.

12. The apparatus according to claim 8, wherein the bed support has a flat support surface, and the plurality of hearth beds and the final hearth bed have flat bottom portions and are placed on the bed support with the flat bottom portions and the support surface contacted with each other.

13. The apparatus according to claim 8, wherein the quenching unit is arranged so that a top surface of the lower air blower is inclined downwardly as located downstream so as to form an angle $\Phi$ with respect to the top surface of the final hearth bed.

14. The apparatus according to claim 8, wherein the first surface section is defined by cutting away an upstream end corner of the final hearth bed.

* * * * *